(12) United States Patent
Bachmaier et al.

(10) Patent No.: US 10,435,164 B2
(45) Date of Patent: Oct. 8, 2019

(54) PROPELLER DRIVES AND VEHICLES

(71) Applicant: SIEMENS AKTIENGESELLSCHAFT, München (DE)

(72) Inventors: Georg Bachmaier, München (DE); Christian Bachmann, München (DE); Dominik Bergmann, Sachsenkam (DE); Matthias Gerlich, München (DE); Guillaume Pais, München (DE); Iason Vittorias, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/743,750

(22) PCT Filed: Jul. 18, 2016

(86) PCT No.: PCT/EP2016/067048
§ 371 (c)(1),
(2) Date: Jan. 11, 2018

(87) PCT Pub. No.: WO2017/013059
PCT Pub. Date: Jan. 26, 2017

(65) Prior Publication Data
US 2018/0201383 A1     Jul. 19, 2018

(30) Foreign Application Priority Data

Jul. 20, 2015  (DE) .......................... 10 2015 213 580

(51) Int. Cl.
*B64D 27/24*  (2006.01)
*B64C 11/30*  (2006.01)
*B64D 27/02*  (2006.01)

(52) U.S. Cl.
CPC .............. *B64D 27/24* (2013.01); *B64C 11/30* (2013.01); *B64C 2201/042* (2013.01); *B64D 2027/026* (2013.01); *Y02T 50/64* (2013.01)

(58) Field of Classification Search
CPC .......... B64D 2027/026; B64D 2221/00; B64D 27/10; B64D 33/08; B64D 27/24;
(Continued)

(56) References Cited

U.S. PATENT DOCUMENTS 2,462,201 A * 2/1949 Kilgore ................. B64D 27/24
244/60
3,543,518 A * 12/1970 Shibata .................... B60K 5/08
290/4 R
(Continued)

FOREIGN PATENT DOCUMENTS

DE  102008061951 A1  6/2010
DE  102012010937 A1  12/2013
(Continued)

OTHER PUBLICATIONS

German Search Report for related German Application No. 10 2015 213 580.2 dated Apr. 14, 2016.
(Continued)

*Primary Examiner* — Thai T Dinh
(74) *Attorney, Agent, or Firm* — Lempia Summerfield Katz LLC

(57) ABSTRACT

The disclosure relates to a propeller drive that is, in particular, an aircraft drive and includes a propeller machine and an electric drive connected without a converter to the propeller machine. The aircraft includes such a propeller drive.

15 Claims, 2 Drawing Sheets

(58) Field of Classification Search
CPC ............. Y02T 10/7005; Y02T 10/7241; Y02T 90/127; Y02T 10/7283; Y02T 90/34; Y02T 10/72; B60L 15/2009; B60L 2240/423; B60L 7/12; B60L 2240/12; B60L 53/00
See application file for complete search history.

(56) References Cited

U.S. PATENT DOCUMENTS

| | | | | |
|---|---|---|---|---|
| 4,338,525 | A * | 7/1982 | Kilgore | B60L 11/08 290/17 |
| 5,927,417 | A | 7/1999 | Brunner et al. | |
| 7,520,353 | B2 * | 4/2009 | Severinsky | B60H 1/004 180/65.28 |
| 8,602,144 | B2 * | 12/2013 | Boskovitch | B60K 6/387 180/65.22 |
| 9,764,732 | B2 * | 9/2017 | Kim | B60W 20/17 |
| 2001/0037905 | A1 * | 11/2001 | Nogi | B60K 6/445 180/65.235 |
| 2003/0085577 | A1 * | 5/2003 | Takaoka | B60K 6/365 290/40 C |
| 2007/0227792 | A1 | 10/2007 | Yonemori et al. | |
| 2008/0103632 | A1 * | 5/2008 | Saban | H02K 3/28 700/286 |
| 2010/0004090 | A1 * | 1/2010 | Mizutani | B60K 6/52 477/7 |
| 2013/0147204 | A1 * | 6/2013 | Botti | B64D 27/24 290/1 A |
| 2015/0148993 | A1 | 5/2015 | Anton et al. | |
| 2015/0151844 | A1 * | 6/2015 | Anton | B64C 31/024 244/55 |

FOREIGN PATENT DOCUMENTS

| | | |
|---|---|---|
| DE | 102012209803 A1 | 12/2013 |
| DE | 202012012835 U1 | 2/2014 |
| EP | 1852166 A1 | 11/2007 |
| WO | WO2010046938 A1 | 4/2010 |
| WO | WO2014074046 A1 | 5/2014 |

OTHER PUBLICATIONS

PCT International Search Report and Written Opinion of the International Searching Authority dated Sep. 13, 2016 for corresponding PCT/EP2016/067048.

European Office Action for European Patent Application No. 16 739 484.0-1015, dated Jul. 23, 2019.

* cited by examiner

PROPELLER DRIVES AND VEHICLES

The present patent document is a § 371 nationalization of PCT Application Serial Number PCT/EP2016/067048, filed Jul. 18, 2016, designating the United States, which is hereby incorporated by reference, and this patent document also claims the benefit of DE 10 2015 213 580.2, filed Jul. 20, 2015, which is also hereby incorporated by reference.

TECHNICAL FIELD

The disclosure relates to a propeller drive as well as to a vehicle, in particular, an aircraft.

BACKGROUND

For vehicles in the form of small aircraft, hybrid-electric drives are the subject of intensive development. It is therefore known to use serial hybrid concepts, that is to say a drive motor, in particular an internal combustion engine, as well as an electric generator for generating electrical energy are accommodated in the fuselage of the small aircraft, with the result that favorable mass distribution and aerodynamics may be achieved. The conversion of electrical energy into kinetic energy of the propellers is carried out by compact, aerodynamically favorable electric motors. Although such serial-hybrid concepts have a lower efficiency compared with parallel hybrid concepts, this is outweighed by the aerodynamic and system-related advantages.

SUMMARY AND DESCRIPTION

The object of the disclosure is to provide an improved propeller drive which has a high degree of flexibility, may be manufactured with little technical expenditure and is of lightweight and compact design. In addition, it is an object of the disclosure to provide a vehicle, in particular an aircraft, with an improved propeller drive.

The scope of the present disclosure is defined solely by the appended claims and is not affected to any degree by the statements within this summary. The present embodiments may obviate one or more of the drawbacks or limitations in the related art.

The propeller drive is, in particular, a vehicle drive, (e.g., an aircraft drive). The propeller drive includes a propeller machine as well as an electric drive connected without a converter to the propeller machine. In this context, the expression according to which the electric drive is connected "without a converter" to the propeller machine means that precisely the electrical connection of the electric drive to the propeller machine takes place without a detour via a converter. This, of course, does not mean that the propeller drive itself necessarily has to be embodied without a converter.

Owing to this embodiment of the propeller drive, it may be embodied while dispensing with a converter and the installation space associated with such converters as well as the weight which is involved with converters. In addition, converters may result in approximately 2% of loss, with the result that a connection of the electric drive without a converter to the propeller machine may be embodied in a low-loss fashion. In contrast, the electric drive may be electrically connected directly to the propeller machine, with the result that a significantly simpler design of the propeller drive is possible. Particularly in the case of aircraft drives, a corresponding converter may easily be dispensed with, because, in the case of propeller drives, the propeller has to be operated with optimized efficiency only in a very restricted load range. In particular, in the case of electric drives which convert a mechanical rotational movement into electric energy, a fixed ratio between the rotational speed of this electric drive and the rotational speed of the propeller of the propeller drive is possible, because, in particular in the case of low rotational speeds, there is a virtually negligible load.

With the propeller drive, the electric drive suitably has an AC connection, (e.g., a three-phase electrical AC connection), to the propeller machine. Particularly, three-phase current may be fed directly into the propeller machine via the AC connection of the electric drive and propeller machine.

The electric drive includes an electrical energy source, in particular with a drive motor, (e.g., an internal combustion engine), and a current generator connected thereto. Therefore, for example, energy stored in fuel may be converted into electrical energy in a known manner.

Advantageously, with the propeller drive, an electrical energy store may be connected to the electric drive, in particular by a converter. In this way, energy may be fed into the energy store, for example, in order to charge the energy store during operation, for example, during the flight in the case of a propeller drive of an aircraft. If the energy store is connected to the electric drive by a converter, the converter is configured for the differential power, which is respectively made available at a maximum level by the energy store. Therefore, only this differential power is also subject to loss. In particular, in the case of a propeller drive of a small aircraft, capacitances of the electric energy store are so low that they are at most designed for a full power drain which lasts a few minutes. The converter(s) is/are also advantageously suitably configured to these requirements. In particular, the converter may have a very small heat exchanger, or else the converter is configured in such a way that the thermal capacity of a cooling medium is sufficient to avoid exceeding an upper limit in temperature during these few minutes of full load operation. Consequently, it is possible to allow for the fact that full load operation is not provided permanently.

With the propeller drive, the electric drive and the propeller machine, and/or the electric drive and the energy store may suitably each be connected to one another in a switchable fashion, (e.g., by three-phase switches), which may be embodied as contactors. In this development, one or more of the electrical energy store, the electric drive, or the propeller machine may be decoupled from other parts of the propeller drive. In this way, it is advantageously possible to disconnect faulty components of the propeller drive which may otherwise disrupt the rest of the propeller drive and put the propeller drive out of operation. In addition, further operating states may flexibly be achieved, in particular, the charging of the electrical energy store, if no drive torque is present at the propeller.

With the propeller drive, the propeller machine advantageously has at least one propeller with a controllable blade pitch angle, at least one separate open-loop rotational speed controller, closed-loop rotational speed controller, or combination thereof for performing open-loop and/or closed-loop control of the rotational speed of the at least one propeller. If a propeller machine is provided with one or more of a controllable blade pitch angle, a separate open-loop rotational speed controller, or a closed-loop rotational speed controller, the rotational speed of the propeller may be kept in a very narrow range. In this way, during the flying operation, the rotational speed of the propeller may be kept in a fixed ratio with respect to the rotational speed of a drive motor of the electric drive, with the result that the rotational speed of the drive motor and the rotational speed of the propeller may be coupled directly.

With the propeller drive, the propeller machine, on the one hand, and the electric drive, on the other, may suitably have a different number of magnetic pole pairs. If appropriate, in this development, differences in rotational speed between a drive motor of the electric drive and the propeller may be compensated by this different number of pole pairs, with the result that in this respect a further degree of freedom in terms of operation is provided.

With the propeller drive, the propeller machine expediently has a synchronous machine which is configured, in particular, in such a way that during operation a tipping point is not reached. In particular, a mechanism for limiting the dynamics of the system is provided, with the result that excessively high acceleration torques, which would exceed the tipping moment of the electric drive, cannot occur. However, this appears non-critical because customary propeller drives merely require low dynamics of, in particular, 10 seconds of idling up to the full load. In particular, in the case of propeller drives for aircraft, such a configuration is therefore unproblematic. With the propeller drive, the synchronous machine may be embodied without a damper winding. Therefore, in particular, in the case of propeller machines, the braking torque behaves proportionally to the square of the rotational speed of the propeller of the propeller machine. Additional damping therefore does not necessarily have to be provided. In synchronous machines in the form of propeller machines, it is therefore advantageously possible to dispense with a damper winding or a damper cage. In the case of aircraft propeller drives, the weight caused by the damper winding may advantageously be eliminated.

The propeller drive includes a cooling circuit, wherein one or more of the electric drive, the propeller machine, the drive motor, or the electric generator are jointly thermally connected to the cooling circuit. Because in this development the cooling water temperature does not form a limiting variable for converters, particularly, a drive motor and the propeller machine may be connected to the same cooling circuit.

The propeller drive may be embodied as a hybrid propeller drive.

The vehicle is particularly an aircraft and is embodied with a propeller drive, as described above. The vehicle is advantageously a hybrid vehicle.

BRIEF DESCRIPTION OF THE DRAWINGS

The disclosure will be described in more detail below with reference to an exemplary embodiment which is illustrated in the drawing, in which.

DETAILED DESCRIPTION

Figure 1:
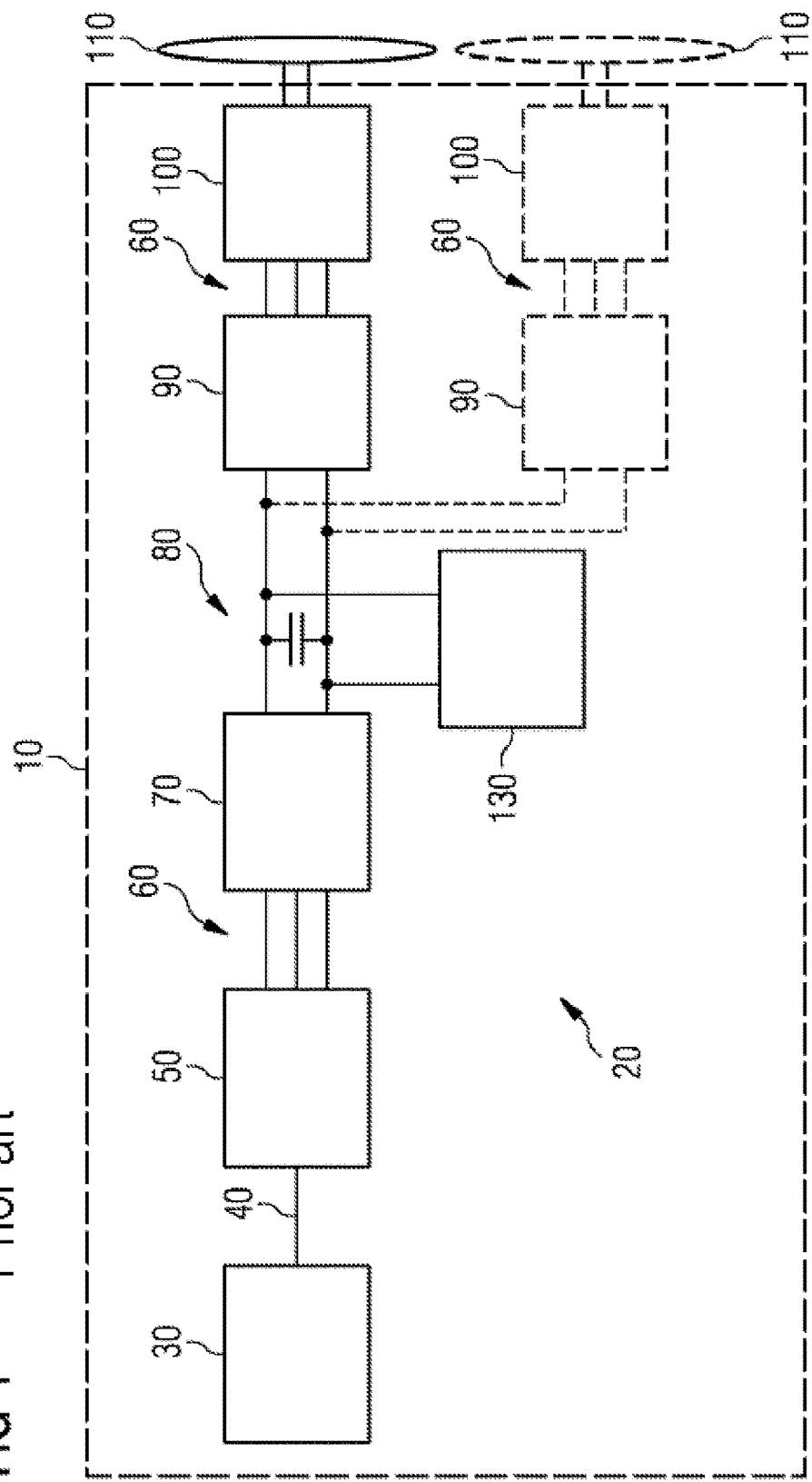
FIG. 1 depicts a basic schematic diagram of a known aircraft having a propeller drive which corresponds to the prior art.

The aircraft 10 illustrated in FIG. 1 has an aircraft drive in the form of a propeller drive 20. The design of this propeller drive 20 is known per se and forms part of the prior art.

The propeller drive 20 includes an internal combustion engine 30 which burns fuel, in the case illustrated aviation fuel, for the purpose of acquiring kinetic energy. The internal combustion engine 30 makes available this kinetic energy in the form of rotational energy by a rotating shaft 40. The rotating shaft 40 is connected to an electric generator 50 that converts the kinetic energy into electrical energy by electromagnetic induction. The electric generator 50 makes available the electrical energy in the form of three-phase current with corresponding power. This three-phase current feeds, via a three-phase line connection 60, an electric converter 70, which converts the three-phase current into a DC intermediate circuit 80. In turn, a converter 90 is connected to this DC intermediate circuit 80, the converter 90 making available a three-phase current with a suitable frequency for driving an electric machine 100, which converts the three-phase current into kinetic energy of a rotating propeller 110.

In the example illustrated in FIG. 1, the in each case two converters 90 are respectively present on the drive side of the DC intermediate circuit 80, which converters 90 each feed an electric machine 100 in order to drive one propeller 110 each.

In order to buffer electrical energy, a high-voltage battery 130 is also present in the example shown in FIG. 1, which high-voltage pressure battery 130 is connected to the DC intermediate circuit 80 by a DC connection.

Figure 2:
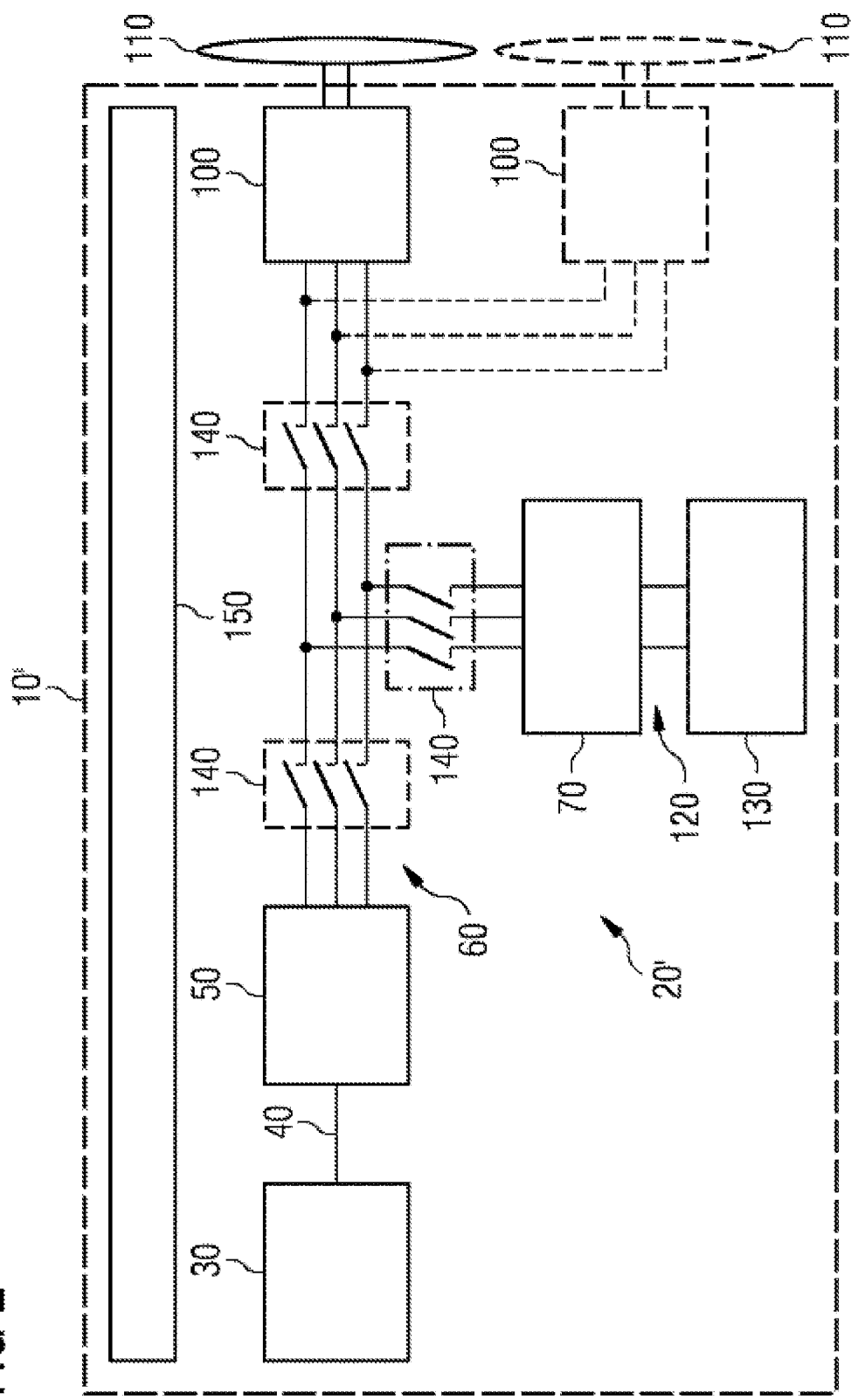
FIG. 2 depicts a basic schematic diagram of an aircraft having a propeller drive according to an exemplary embodiment.

The aircraft 10' illustrated in FIG. 2 has, on the other hand, an aircraft drive in the form of a propeller drive 20'.

The propeller drive 20' shown in FIG. 2 also has an internal combustion engine 30 that burns fuel in the form of aviation fuel and makes available kinetic energy as rotational energy by a rotating shaft 40. As in the example illustrated in FIG. 1, the rotating shaft 40 is connected to an electric generator 50 that converts the kinetic energy into electrical energy by electromagnetic induction. The electric generator 50 also makes available the electrical energy in the form of three-phase current with a corresponding power level according to FIG. 2.

However, in contrast to the propeller drive 20 illustrated in FIG. 1, the electric generator 50 according to FIG. 2 is not connected to the electric machine 100 via two converters 70, 90 and an intermediate DC intermediate circuit 80. Instead, the electric generator 50 feeds the electric machine 100 directly, that is to say without a converter, by a three-phase line connection 60. Consequently, the three-phase current generated in the electric generator 50 is fed directly into the electric machine 100, with the result that the three-phase current of the electric generator 50 may be converted into a rotational movement of the propeller 110 directly by the electric machines 100.

In the exemplary embodiment illustrated in FIG. 2, the propeller drive 20' has two electric machines 100 connected in parallel to the three-phase line connection 60 and are in the form of synchronous machines, each with a propeller 110 connected thereto. Of course, in further exemplary embodiments (not shown separately), a different number of electric machines 100 with propellers 110 respectively connected thereto may be provided. The electric machines 100 are embodied without a damper winding, e.g., a damper winding or a damper cage is not present.

In order to buffer electrical energy, a high-voltage battery 130 is additionally present in the exemplary embodiment shown in FIG. 2, which high-voltage battery 130 is connected by a converter 70 to the three-phase line connection 60, which connects the electric generator 50 and the electric machines 100 to one another. For this purpose, the converter 70 converts the three-phase current into a DC circuit 120 in order to charge the high-voltage battery 130.

On the one hand, the high-voltage battery 130 may be decoupled from the rest of the propeller drive 20' by an electric switch 140 if the high-voltage battery 130 is not necessary to operate the propeller drive 20'. For example, the high-voltage battery 130 is connected to the rest of the propeller drive 20' only when energy is actually to be fed from the high-voltage battery 130 or into the high-voltage battery 130.

In addition, the drive motor 30, together with the shaft 40 and the electric generator 50 may be decoupled from the rest of the propeller drive 20' by a further electric switch 140. In addition, by a further electric switch 140, the electric machines 100 may be decoupled, together with the propellers 110 connected thereto, from the rest of the propeller drive 20'. In particular, damaging parts of the propeller drive 20' may, if appropriate, also be decoupled by the electric switches 140.

In the illustrated exemplary embodiment, the electric switches 140 may be embodied as mechanical switches for high power levels, specifically as contactors of the type of three-phase switches. Basically, in further exemplary embodiments (not illustrated separately) the electric switches 140 may also be implemented in some other way.

In the exemplary embodiment illustrated in FIG. 2, a common cooling circuit 150 is additionally provided for cooling the internal combustion engine 30 and the electric generator 50. The cooling circuit 150 is a cooling water circuit.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A propeller drive comprising:
a propeller machine having a synchronous machine configured such that a braking torque behaves proportionally to a square of a rotational speed of a propeller of the propeller machine such that a tipping moment is not reached during operation of the propeller drive;
an electric drive directly connected via an AC connection, without a converter, to the propeller machine; and
an electrical energy store connected to the electric drive,
wherein the electric drive, the propeller machine, and the electrical energy store are connected to one another in a switchable fashion such that at least the following configurations are provided: (1) the electric drive powers the propeller machine, (2) the electrical energy store powers the propeller machine, and (3) the electric drive charges the electrical energy store.

2. The propeller drive of claim 1, wherein the electric drive has an electrical energy source and a current generator connected thereto.

3. The propeller drive of claim 2, further comprising:
a cooling circuit, wherein one or more of the electric drive, the propeller machine, the drive motor, or the electric generator is thermally connected to the cooling circuit.

4. The propeller drive of claim 2, wherein the electrical energy source is a drive motor.

5. The propeller drive of claim 4, wherein the drive motor is an internal combustion engine.

6. The propeller drive of claim 1, wherein the propeller machine has at least one propeller with a controllable blade pitch angle, at least one separate open-loop rotational speed controller, at least one closed-loop rotational speed controller, or a combination thereof.

7. The propeller drive of claim 1, wherein the propeller machine and the electric drive have a different number of magnetic pole pairs.

8. The propeller drive of claim 1, wherein the propeller machine is embodied without a damper winding.

9. The propeller drive of claim 1, wherein the propeller drive is a vehicle drive.

10. The propeller drive of claim 9, wherein the vehicle drive is an aircraft drive.

11. The propeller drive of claim 1, wherein the AC connection is a three-phase electrical connection.

12. The propeller of claim 1, wherein the electrical energy store is connected to the electric drive via a converter.

13. The propeller drive of claim 1, wherein the electric drive, the propeller machine, and the electrical energy store are each connected to one another in the switchable fashion by three-phase switches.

14. A vehicle comprising:
a propeller; and
a propeller drive connected to and configured to drive the propeller, the propeller drive having:
a propeller machine having a synchronous machine configured such that a braking torque behaves proportionally to a square of a rotational speed of a propeller of the propeller machine such that a tipping moment is not reached during operation of the propeller drive;
an electric drive directly connected via an AC connection, without a converter, to the propeller machine; and
an electrical energy store connected to the electric drive,
wherein the electric drive, the propeller machine, and the electrical energy store are connected to one another in a switchable fashion such that at least the following configurations are provided: (1) the electric drive powers the propeller machine, (2) the electrical energy store powers the propeller machine, and (3) the electric drive charges the electrical energy store.

15. The vehicle of claim 14, wherein the vehicle is an aircraft.

* * * * *